United States Patent
Simeon et al.

(10) Patent No.: US 10,131,432 B2
(45) Date of Patent: Nov. 20, 2018

(54) PRIVACY DIVIDER FOR ADJACENT PARALLEL PASSENGER SEATS

(71) Applicant: B/E Aerospace, Inc., Wellington, FL (US)

(72) Inventors: Jayson C. Simeon, Round Rock, TX (US); Nathan E. Careless, Round Rock, TX (US); Steven K. Brown, Austin, TX (US); Nathan P. Wang, Austin, TX (US); Mark W. Foohey, Austin, TX (US); Heather D. Benoit, Austin, TX (US); Daniel J. Yee, Austin, TX (US); Jens P. Johnson, Austin, TX (US); Terry L. Branson, Austin, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 225 days.

(21) Appl. No.: 15/093,131

(22) Filed: Apr. 7, 2016

(65) Prior Publication Data

US 2016/0297530 A1 Oct. 13, 2016

Related U.S. Application Data

(60) Provisional application No. 62/144,079, filed on Apr. 7, 2015.

(51) Int. Cl.
*B64D 11/06* (2006.01)
*B61D 1/04* (2006.01)

(52) U.S. Cl.
CPC ............ *B64D 11/0606* (2014.12); *B61D 1/04* (2013.01); *B64D 11/0601* (2014.12); *B64D 11/0602* (2014.12); *B64D 11/0605* (2014.12); *Y02T 50/46* (2013.01)

(58) Field of Classification Search
None
See application file for complete search history.

(56) References Cited

U.S. PATENT DOCUMENTS

| | | | | |
|---|---|---|---|---|
| 2,596,395 | A * | 5/1952 | Fitz ......................... | A47H 23/04 139/420 R |
| 2,632,408 | A * | 3/1953 | Giles .................. | B64D 11/0601 105/344 |
| 6,056,239 | A | 5/2000 | Cantu et al. | |
| 6,446,751 | B1 * | 9/2002 | Ahuja .................... | A47H 23/02 181/280 |
| 7,934,679 | B2 * | 5/2011 | Bock .................. | B64D 11/0606 244/118.6 |

(Continued)

OTHER PUBLICATIONS

Search Report and Written Opinion of International Application No. PCT/US2016/026415; dated Jun. 22, 2016; 13 pages.

*Primary Examiner* — Richard R. Green
(74) *Attorney, Agent, or Firm* — Clements Bernard Walker PLLC

(57) ABSTRACT

A suite divider for a passenger suite seating arrangement including separate first and second panels adapted to be deployed along a top of a partition wall separating laterally adjacent passenger suites, the first and second panels adapted to be stowed near respective first and second ends of the partition wall to connect the laterally adjacent passenger suites, and horizontally driven together to separate the laterally adjacent passenger suites.

7 Claims, 3 Drawing Sheets

(56) References Cited

U.S. PATENT DOCUMENTS

| | | | | |
|---|---|---|---|---|
| 9,567,085 | B2* | 2/2017 | Suzuki | B64D 11/0606 |
| 2003/0029576 | A1* | 2/2003 | Kimmet | E06B 9/0638 |
| | | | | 160/84.04 |
| 2008/0224510 | A1 | 9/2008 | Hankinson et al. | |
| 2013/0248655 | A1* | 9/2013 | Kroll | B64D 11/0606 |
| | | | | 244/118.6 |
| 2014/0035330 | A1 | 2/2014 | Henshaw | |
| 2014/0084647 | A1 | 3/2014 | Darbyshire | |
| 2015/0166183 | A1* | 6/2015 | Henshaw | B64D 11/0606 |
| | | | | 244/118.6 |
| 2015/0210393 | A1* | 7/2015 | Savian | B64D 11/0601 |
| | | | | 244/118.6 |

\* cited by examiner

PRIVACY DIVIDER FOR ADJACENT PARALLEL PASSENGER SEATS

CROSS-REFERENCE TO RELATED APPLICATION

This application claims priority from U.S. application Ser. No. 62/144,079 filed Apr. 7, 2015, the entirety of which is incorporated by reference herein.

TECHNICAL FIELD AND BACKGROUND OF THE INVENTION

The present invention relates generally to aircraft passenger suite seating arrangements and suite dividers for enhancing or relaxing privacy between adjacent seated passengers, and more particularly, to horizontally translating suite dividers configured to stow to connect adjacent suites and deploy to separate adjacent suites as desired by passengers seated in the adjacent suites.

Airline carriers offering premium seating classes often configure their classes with individual passenger suites. Passenger suites are typically defined by partition walls that can be shared between longitudinally or laterally adjacent suites. Suites can be arranged into seating groups to form a center column and outboard columns, wherein columns can be separated by an aisle oriented parallel to the longitudinal axis of the aircraft.

While rows of economy class seats are more easily configured in a cabin layout, suites must be strategically arranged to provide the necessary seating density while maintaining the luxuries and feeling of open space that premium class passengers expect. In this regard, adjacent suites typically nest such that primary seat space is maximized while secondary spaces are minimized and/or shared between adjacent suites.

In some instances, suites can be arranged to nest such that longitudinally adjacent seats face toward one another while laterally adjacent seats face in the same direction, or vice versa. At certain times it may be desirable to provide complete privacy between longitudinally or laterally adjacent suites, while at other times it may be desirable to relax the degree of privacy between adjacent suites to allow passengers to converse and interact. In this regard, deployable partitions can be used to connect and separate passenger suites.

Conventional privacy partitions usually take the form of solid panels that deploy vertically or horizontally from within a permanent dividing wall. Solid panels are heavy and require large dedicated storage space in dividing walls to accommodate large panel sizes. Since large panels are difficult to stow, panel size is often limited. Solid panels also offer only two modes of privacy, i.e., stowed and deployed, and therefore are not capable of offering intermediate degrees of privacy.

Accordingly, what is needed are privacy solutions better than those found in the prior art in terms of stowage space requirements, weight, expandability to fill large spaces, ability to offer both full and intermediate degrees of privacy, etc.

BRIEF SUMMARY OF THE INVENTION

It is therefore an object of the invention to provide a privacy partition for selectively connecting or separating adjacent passenger seats.

It is another object of the invention to provide a passenger suite cabin layout that includes a plurality of nesting suites.

It is yet another object of the invention to provide a passenger suite arrangement including a seating group including both longitudinally adjacent and laterally adjacent passenger suites.

It is yet another object of the invention to arrange aircraft passenger suites such that adjacent suites can be at least partly open to one another to allow adjacent passengers to converse and interact when desired.

It is yet another object of the invention to provide space saving, stowable privacy partitions between suites.

To achieve the foregoing and other objects and advantages, in a first embodiment the present invention provides a suite divider for a passenger suite seating arrangement including separate first and second panels adapted to be deployed along a top of a partition wall separating laterally adjacent passenger suites, the first and second panels adapted to be stowed near respective first and second ends of the partition wall to connect the laterally adjacent passenger suites, and horizontally driven together to separate the laterally adjacent passenger suites.

In another aspect, the separate first and second panels can each include a plurality of generally vertically extending rods that simulate a semi-transparent barrier between the laterally adjacent passenger suites when the separate first and second panels are deployed.

In yet another aspect, the separate first and second panels can each include an articulating panel including a plurality of hinged segments.

In yet another aspect, mating ends of the separate first and second panels can each include a fastener for securing the mating ends together when the separate first and second panels are fully deployed.

In yet another aspect, adjacent ones of the plurality of segments can fold upon one another when the first and second panels are stowed.

In yet another aspect, the separate first and second panels can be solid.

In yet another aspect, the separate first and second panels can be optically transparent.

In yet another aspect, the separate first and second panels can be driven along a track on top of or within the partition wall.

In yet another aspect, the passenger suite seating arrangement can include first and second laterally adjacent and parallel passenger seats separated by the partition wall and facing in a common direction.

In yet another aspect, the passenger suite seating arrangement can include third and fourth parallel passenger seats separated by the partition wall, the third seat facing in a direction of the first seat and the fourth seat facing in a direction of the second seat, and wherein the suite divider separates the first and third seats from the second and fourth seats.

According to another embodiment, the present provides a passenger suite seating arrangement including first and second laterally adjacent and parallel passenger seats separated by a partition wall and facing in a common direction, third and fourth parallel passenger seats separated by the partition wall, the third seat facing in a direction of the first seat and the fourth seat facing in a direction of the second seat, and a deployable suite divider separating the first and third seats from the second and fourth seats, the deployable suite divider including separate first and second panels adapted to be horizontally driven along a top of the partition wall, the first and second panels adapted to be stowed near respective first and second ends of the partition wall to connect the first and third seats to the second and fourth seats, and driven together to separate the first and third seats from the second and fourth seats.

In another aspect, the separate first and second panels can each include a plurality of generally vertically extending rods that simulate a semi-transparent barrier when the separate first and second panels are deployed, an articulating panel including a plurality of hinged segments, or a solid panel.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
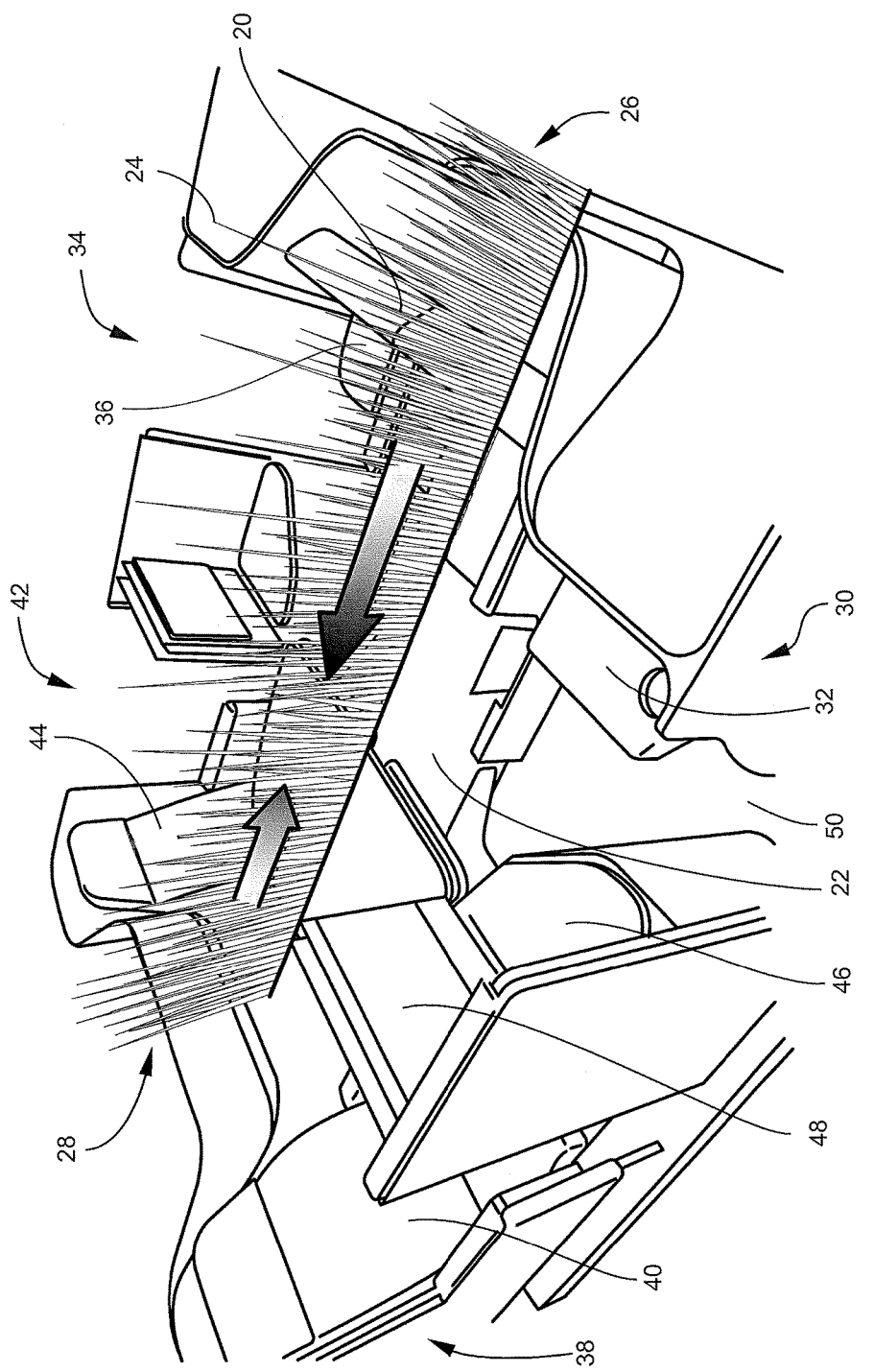
FIG. 1 is a perspective view of a passenger suite arrangement including a deployable suite divider having a plurality of rods that simulate a semi-transparent barrier.

FIG. 1 shows an exemplary aircraft passenger suite seating arrangement including a suite divider 20 according to a first embodiment of the invention positioned atop a vertical partition wall 22. Suite divider 20 generally includes a plurality of linear rods 24 arranged to simulate a transparent barrier divider thru which passengers can reach on demand to interact with a passenger in an adjacent suite. The rods 24 can be divided into separate movable sections. In one embodiment, the sections include first and second panels 26, 28 that are driven toward each other and meet to form continuous partition. The first and second panels 26, 28 can be driven together or independently, and driving may be automated or manual (e.g., pulling).

The first and second panels 26, 28 generally move between stowed positions near the respective first and second ends of the partition wall, and deployed positions as shown covering the top of the partition wall 22 and forming a continuous barrier. In the stowed configuration, the plurality of rods 24 may bunch together for compact stowing, and in the deployed configuration may be spread apart. The rods 24 can be generally vertically extending. The directional arrows in FIG. 1 indicate that the two panels 26, 28 can be horizontally driven or manually pulled together to deploy the suite divider 20.

The rods 24 can have varying heights and/or diameters to simulate grasses and soften the appearance of the divider as shown. Each of the liner rods 22 may be resiliently flexible so that rods can be moved apart to create a temporary passage between the rods to allow interaction between the suites. The rods 24 can be made from suitable materials including, but not limited to, plastic and plastic coated metals, among other materials. The rods 24 extend generally vertically from a top surface of the partition wall 22 to a predetermined vertical height above the wall, for example, up to about one meter or more.

In an alternative embodiment the rods 24 can be fixed in the top of the partition wall 22 to form a permanent semi-transparent partition. Using vertical rods 24 instead of solid panels provides a comparable degree of privacy while reducing weight and permitting temporary, on-demand interaction between adjacent passengers without having to stow the suite divider 20. Rods 24 also allow for dividers having a long length and height without appreciable weight. The bottom ends of the rods 24 can be held in a base or track located atop or within the partition wall 22, and in a further embodiment the entire track can move vertically relative to the static partition wall 22.

The passenger suite seating arrangement shown includes four individual passenger suites. The passenger suites include a first suite 30 having a first seat 32, a second suite 34 having a second seat 36, a third suite 38 having a third seat 40, and a fourth suite 42, having a fourth seat 44. The first and second seats 32, 36 are laterally adjacent, oriented parallel to one another, face in the same direction, and are separated by the partition wall 22. The first and third seats 32, 40 are located on the same side of the partition wall 22, face each other, and are longitudinally adjacent. The second and fourth seats 36, 44 are located on the same side of the partition wall 22, face each other, and are longitudinally adjacent. The third and fourth seats 40, 44 are laterally spaced apart, oriented parallel to one another, face in the same direction, and are separated by the partition wall 22. Thus, the partition wall 22 generally separates the first and third suites 30, 38 from the second and fourth suites 34, 42, and can be used to enhance or relax privacy between all seats in this four suite seating arrangement.

All four seats 32, 36, 40, 44 are preferably configured to adjust between an upright sitting position and a lie-flat sleeping position. The first and second seats 32, 36 can be considered inboard seats because they are positioned away from their respective longitudinal aisle, while the third and fourth seats 40, 44 can be considered outboard seats because they are positioned directly adjacent their respective longitudinal aisle. Each passenger suite can further include a horizontal table 46 and video monitor 48 positioned forward of the seat. The first and second seats 32, 36 are accessed from the aisle by walking through a living area 50 having open floor space laterally adjacent the seating area. The third and fourth seats 40, 44 are accessed directly from the aisle.

Figure 2:
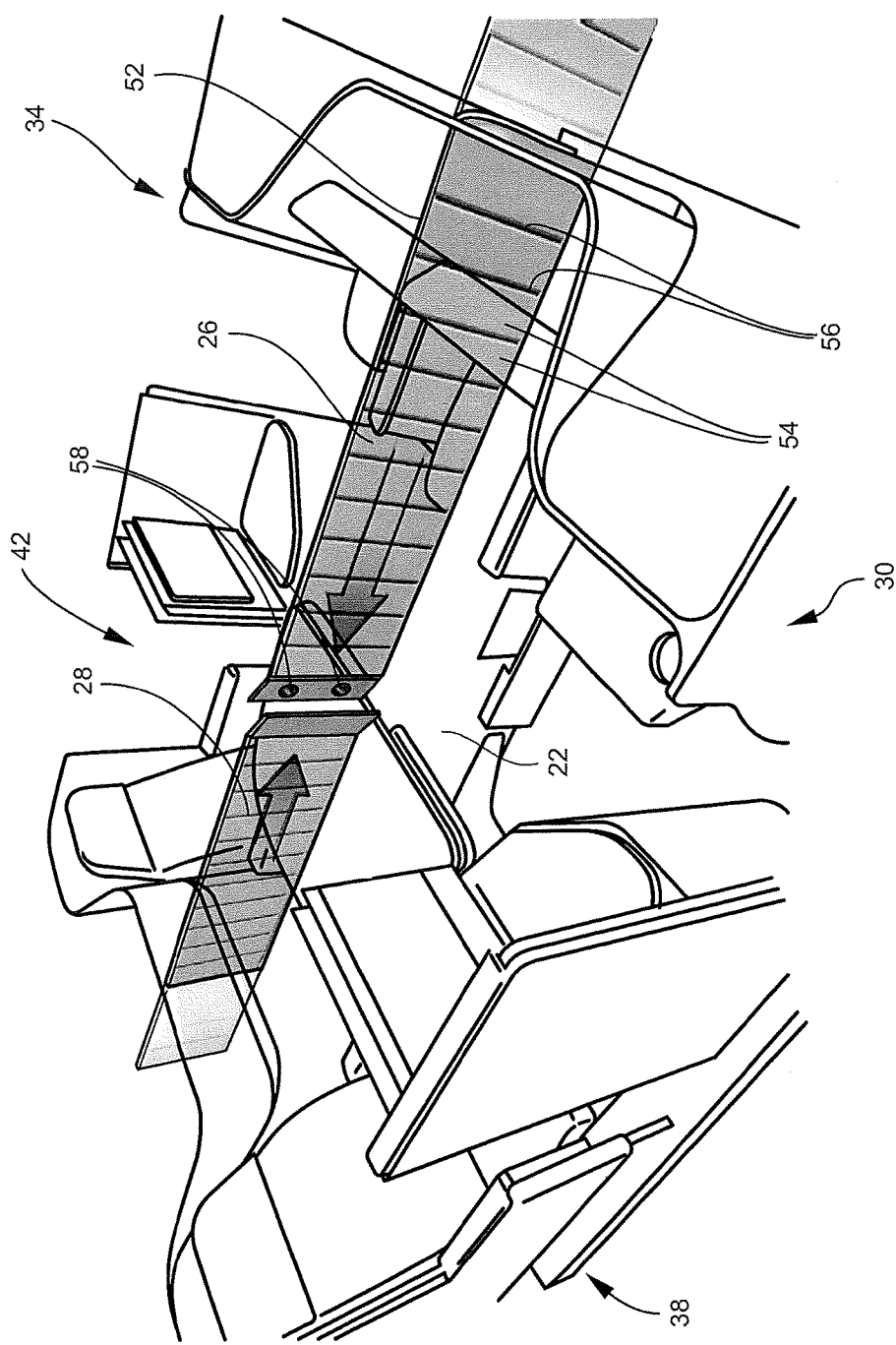
FIG. 2 is a perspective view of a passenger suite arrangement including a deployable suite divider having articulating panels that fold for stowing.

FIG. 2 shows a suite divider 52 according to a second embodiment of the invention adapted for use in the same suite arrangement as shown in FIG. 1. Suite divider 52 also includes horizontally driven first and second panels 26, 28 that come together to form one continuous divider. In this second embodiment, the first and second panels 26, 28 each include a plurality of hinged segments 54. The hinged segments 54 allow the panels 26, 28 to articulate such that adjacent segments can be folded upon each other for compact stowage. In other words, the flexible hinges 56 between segments 54 allow the individual segments to fold together parallel against one another and/or roll around a mandrel for compact stowage.

The first and second panels 26, 28 can be driven by a carriage that travels along a track in the partition wall 22, or may be manually pulled open and closed. The mating ends of each of the first and second panels 26, 28 can include fasteners 58, such as opposite polarity magnetic fasteners, which hold the ends of the panels together when fully deployed. The first and second panels 26, 28 can be opaque, optically transparent or translucent to offer varying degrees of privacy.

Figure 3:
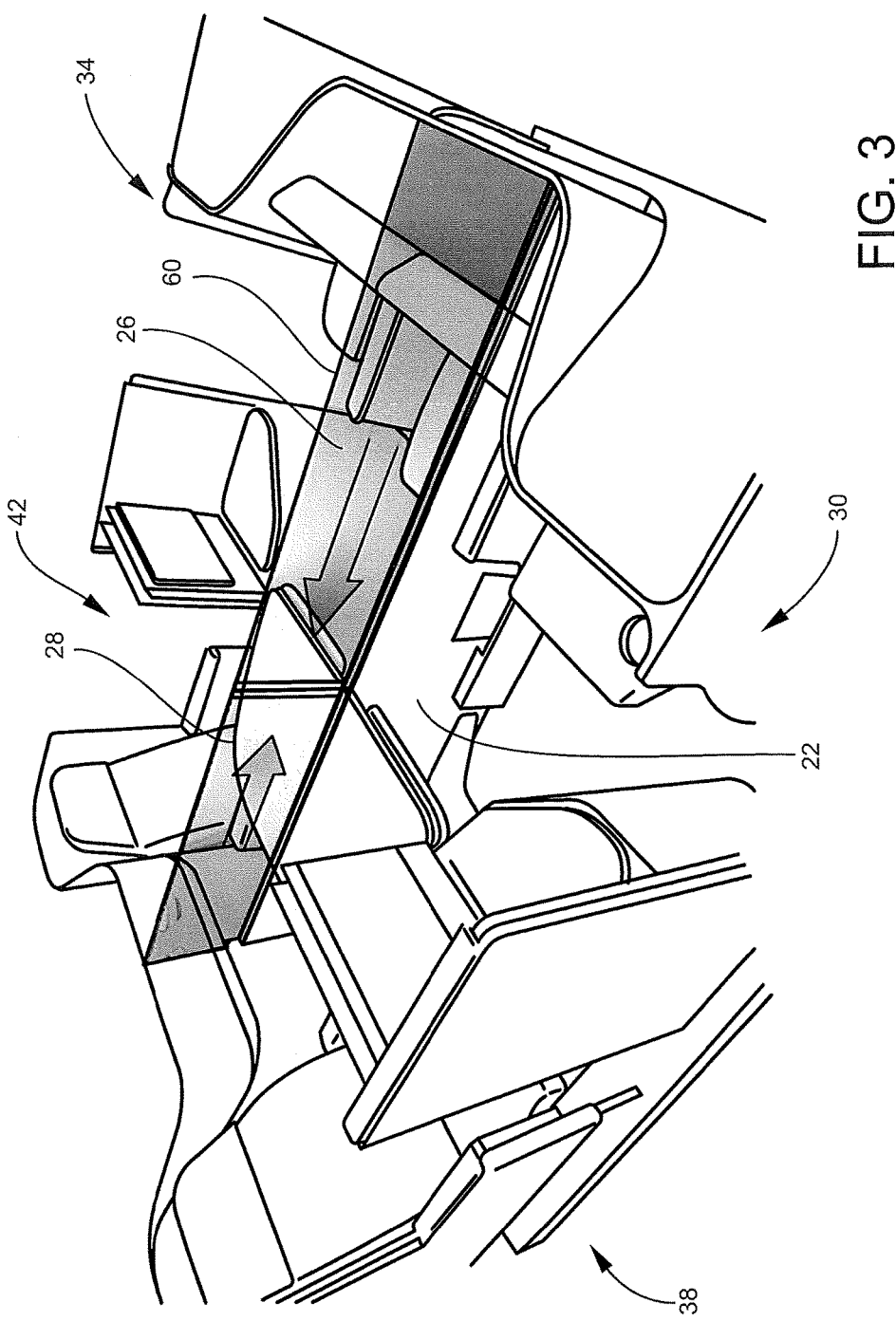
FIG. 3 is a perspective view of a passenger suite arrangement including solid panels.

FIG. 3 shows a suite divider 60 according to a third embodiment of the invention also adapted for use in the same suite arrangement as shown in FIG. 1. Suite divider 60 also includes first and second panels 26, 28 which are horizontally driven toward each other to deploy the partition. Each of the first and second panels 26, 28 sits atop the partition wall 22. Each of the first and second panels 26, 28 can be rigid or flexible. Flexible panels allow the panels to be wound around a mandrel for compact stowing. The first and second panels 26, 28 can be driven horizontally by a carriage in a track positioned in the partition wall 24, or can be manually pulled open and closed. The mating ends of the panels 26, 28 can include any conventional fastener for holding the two panels together when fully deployed. The first and second panels 26, 28 can be opaque, optically transparent or translucent to offer varying degrees of privacy.

In any of the three embodiments discussed above, suite divider motion may be manually actuated or automated. Automated dividers may include a carriage mechanism arranged to pull the panels between stowed and deployed positions. Control panels for actuating carriage movement may be located in each adjacent suite sharing the suite divider such that each passenger is able to control divider deployment, as well as in a flight crew control panel.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger suite seating arrangement, comprising:
a first suite comprising a first seat;
a second suite comprising a second seat, the second suite positioned laterally adjacent the first suite and the first and second seats being laterally adjacent and parallel;
a third suite comprising a third seat, the third suite positioned longitudinally adjacent the first suite and the third seat facing the first seat;
a fourth suite comprising a fourth seat, the fourth suite positioned longitudinally adjacent the second suite and laterally adjacent the third suite, and the fourth seat facing the second seat;
a fixed partition disposed between and separating the first and third suites from the second and fourth suites, the fixed partition extending from floor height to a height less than a height of the first, second, third and fourth seats; and
first and second panels adapted to deploy horizontally along a track disposed along a top of the fixed partition wall, the first panel deployable from a stowed position between the first and third seats and the second panel deployable from a stowed position between the second and fourth seats, the first and second panels deployable to a fully deployed position wherein ends of the first and second panels meet and engage, and wherein each of the first and second panels are free of attachment along a top edge thereof.

2. The passenger suite seating arrangement according to claim 1, wherein the separate first and second panels each comprise a plurality of rods that simulate a semi-transparent barrier when the separate first and second panels are deployed.

3. The passenger suite seating arrangement according to claim 1, wherein the separate first and second panels each comprise an articulating panel including a plurality of hinged segments.

4. The passenger suite seating arrangement according to claim 3, wherein mating ends of the separate first and second panels each comprise a fastener for securing the mating ends together when the separate first and second panels are fully deployed.

5. The passenger suite seating arrangement according to claim 3, wherein adjacent ones of the plurality of segments fold upon one another when the first and second panels are stowed.

6. The passenger suite seating arrangement according to claim 1, wherein the separate first and second panels are solid.

7. The passenger suite seating arrangement according to claim 1, wherein the separate first and second panels are optically transparent.

* * * * *